(12) United States Patent
Attili et al.

(10) Patent No.: US 7,149,794 B1
(45) Date of Patent: Dec. 12, 2006

(54) TRACING LAYER-2 ROUTE IN NETWORKS BASED ON BROADCAST MEDIUM

(75) Inventors: Sailaja S K Attili, Karnataka (IN); Sridhar Aswathnarayan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 747 days.

(21) Appl. No.: 09/824,844

(22) Filed: Apr. 2, 2001

(51) Int. Cl.
*G06F 15/173* (2006.01)

(52) U.S. Cl. .................. 709/223; 709/224; 709/238

(58) Field of Classification Search ............... 709/238, 709/239, 224, 243, 244, 249; 370/254–258, 370/351, 400, 401
See application file for complete search history.

(56) References Cited

U.S. PATENT DOCUMENTS

| | | | | |
|---|---|---|---|---|
| 5,675,578 A | * | 10/1997 | Gruber et al. | 370/248 |
| 5,796,736 A | * | 8/1998 | Suzuki | 370/254 |
| 6,208,977 B1 | * | 3/2001 | Hernandez et al. | 705/34 |
| 6,304,912 B1 | * | 10/2001 | Oguchi et al. | 709/238 |
| 6,377,987 B1 | * | 4/2002 | Kracht | 709/220 |
| 6,538,997 B1 | * | 3/2003 | Wang et al. | 370/241 |
| 6,697,338 B1 | * | 2/2004 | Breitbart et al. | 370/254 |
| 6,704,319 B1 | * | 3/2004 | Durham et al. | 370/408 |
| 6,944,130 B1 | * | 9/2005 | Chu et al. | 370/238.1 |
| 2002/0156920 A1 | * | 10/2002 | Conrad et al. | 709/242 |
| 2003/0135644 A1 | * | 7/2003 | Barrett | 709/238 |

FOREIGN PATENT DOCUMENTS

WO    WO 01/76266 A1  * 10/2001

OTHER PUBLICATIONS

Martin Murhammer, Orcun Atakan, Stefan Bretz, Larry Pugh, Kazunari Suzuki, David Wood, "TCP/IP Tutorial and Overview", 1998, IBM Technical Support Organization, pp. 71-72.*

Bruce Boardman, "Layer 2 Discovery Digs Deep", Nov. 13, 2003, Network Computing, Retreived from http://img.cmpnet.com/nc/1423/graphics/1423ws1__file.pdf.*

Pater J. Welcher, "Discovering Cisco Discovery Protocol", 1996, Retreived from: http://www.netcraftsman.net/welcher/papers/cdp.htm on Apr. 30, 2005.*

Pending U.S. Appl. No. 09/585,709, filed May 31, 2000: Inventors: Clare Chu & Stephen Schleimer Entitled, "Method and Apparatus For Determining A Layer 2 Path In A Switched Network" (48 pages of specification and 13 sheets of drawings).

Pending U.S. Appl. No. 09/524,725, filed Mar. 14, 2000; Inventors: Mehryar Garakani; Entitled, "A Method of Determining a Data Link Path in a Managed Network" (28 pages of specification and 7 sheets of drawings).

* cited by examiner

*Primary Examiner*—Glenton B. Burgess
*Assistant Examiner*—Aaron Strange
(74) *Attorney, Agent, or Firm*—Narendra Reddy Thappeta

(57) ABSTRACT

Tracing the layer-2 devices present between any two systems in a network implemented using broadcast medium A device (receiving device) receives a command including a source and destination system identifiers. If the receiving device is not connected directly to the source system, the receiving device determines a connecting device connecting directly to the source system. The receiving system sends a request packet to the connecting device and receives a response packet. The response packet either indicates that the sending device is directly connected to the destination system or indicates a next device in the connecting path. The request and response sequence is continued until a sending device indicates that the destination system is connected directly.

41 Claims, 5 Drawing Sheets

TRACING LAYER-2 ROUTE IN NETWORKS BASED ON BROADCAST MEDIUM

BACKGROUND OF THE INVENTION

1. Field of the Invention

The present invention relates to communication networks, and more specifically to a method and apparatus for tracing routes in networks based on broadcast medium (e.g., Ethernet).

2. Related Art

A networking environment generally includes network devices connecting user systems. User systems are used to implement user applications, which provide corresponding features to the users using the end systems. A network device ("hereafter device") generally refers to a device which forwards data packets ("packets") between end systems to support various network applications.

It is often helpful to know the specific intermediate devices present in a path taken by packets from a source system (e.g., computer system) to a destination system. For example, when troubleshooting a perceived problem of low data transfer throughput between the source and destination systems, a network administrator may wish to know the intermediate devices so that the problem can potentially be isolated to one of more of the intermediate devices. The path formed by the sequence of the intermediate devices is often referred to as a route between the corresponding source and destination systems.

Utilities which allow the determination of a route (between a source and a destination system) are commonly referred to as trace-route utilities. The well-known "Trace-Route" software program which provides the layer-3 devices between two systems is an example of such an utility. Such an utility generally lists the routers (which operate at the networking layer, also referred as layer-3) present in the path between a source and destination system. Further details of the Trace-Route utility are described in further detail in books entitled, "Internetworking with TCP/IP Volume 1", by Douglas E. Corner, and "TCP/IP Illustrated Volume 1", by W. Richard Stevens, which are both incorporated in their entirety herewith.

Unfortunately, the Trace utility operating at layer-3 level typically does not provide information on any layer-2 devices present in the path between a source and a destination system. The feature is particularly problematic in networks based on broadcast medium since the route taken by packets is not generally pre-configured (i.e., not pre-provisioned, for example, as in ATM networks) and the route is generally determined dynamically. A broadcast medium generally refers to a medium in which several devices would generally be capable of receiving a packet intended for even a point-to-point communication. An example environment may be based on Ethernet/802.3 technology as is well known in the relevant arts.

With respect to routes, in Ethernet/802.3 environment well known in the relevant arts, each device determines the specific direction (usually port on the device) a system is in, by examining a source address present in a received packet header. The path may vary if redundancy is present in the network. In addition, a network administrator may not be able to rule out the introduction of additional devices in the network by other persons. Accordingly, a network administrator having responsibility for a network based on broadcast medium may have particular motivation to know the presence of any intermediate layer-2 devices between two end systems.

Thus, what is needed is a method and apparatus which traces the layer-2 route between a source system and destination system.

SUMMARY OF THE INVENTION

The present invention enables a network administrator to enter a command and determine a list of any intermediate layer-2 devices between a source system and a destination system in a network implemented using broadcast medium. The administrator may enter the command using a command line interface (CLI) on a device ("receive device"), and the receiving device may process the command as described below.

The receiving device first determines a first layer-2 device which is connected directly to the source system. If the destination system is not connected to the receiving device, the receiving device may execute a sequence of loops to determine each intermediate device in the route between the source and destination system. For the purpose of implementing the loops, the receiving device may logically view the first layer-2 device as a present layer-2 device if the destination system is also not directly connected to the first layer-2 device.

The receiving device may send a request packet to the present layer-2 device requesting information on whether the destination system is connected directly to the system. A system is deemed to be directly connected to a device if there are no intermediate devices (and layer-3 devices) between the system and the device. In the described embodiment, the direct connection is present if the system is directly connected to a port of the layer-2 device.

The receiving device may then receive a response packet from the present layer-2 device. The response packet indicates whether the destination system is connected directly to the present layer-2 device, and if not, a subsequent layer-2 device in a route to the destination system if the destination system is not connected directly to the present layer-2 device. The subsequent layer-2 device represents the next (after the present layer-2 device) layer-2 device in the route to the destination system.

The above described sequence of sending and receiving are repeated by using the subsequent layer-2 device in the place of the present layer-2 device until the response packet indicates that the destination system is directly connected to the presently layer-2 device. After one or more iterations (instances) of the sequence, a response packet indicates that the destination system is connected directly to the corresponding present layer-2 device. Thus, the sequence of layer-2 devices detected in the iterations forms the route from the source device to the destination device. The route is said to be traced.

According to another aspect of the present invention, the route between a source system and a destination system is determined even when the receiving device is not directly connected to the source device. To provide such a feature, the receiving device first locates a directly connected device which is connected directly to the source system. In one embodiment, the directly connected device is determined by tracing the route from the receiving device to the first system.

Alternatively, a multicast based approach in which the receiving device broadcasts a packet, and the receiving devices are designed to respond if the source system is connected directly. The directly connected device may then be used as the present layer-2 device, and a request packet may be sent to the present layer-2 device. The sequence of sending and receiving packets is continued until the desired route is entirely trance.

One more aspect of the present invention enables a network administrator to issue the route request commands by using a command line interface on a receiving device. Alternatively, the features may be embodied in general purpose computer systems which generate request packets and process response packets as described above. An embodiment is implemented substantially in the form of software. The request and response packets may be implemented using well-known protocols such as UDP/IP.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention enables a network administrator to check the layer-2 route between a source system and a destination system present in a network. According to another aspect of the present invention, the device receiving the command determines the route by interfacing with each intermediate device in the route, and provides the information to the network manager in a suitable format. The manner in which the device makes such a determination is described below.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in several other environments.

2. Example Environment

Figure 1:
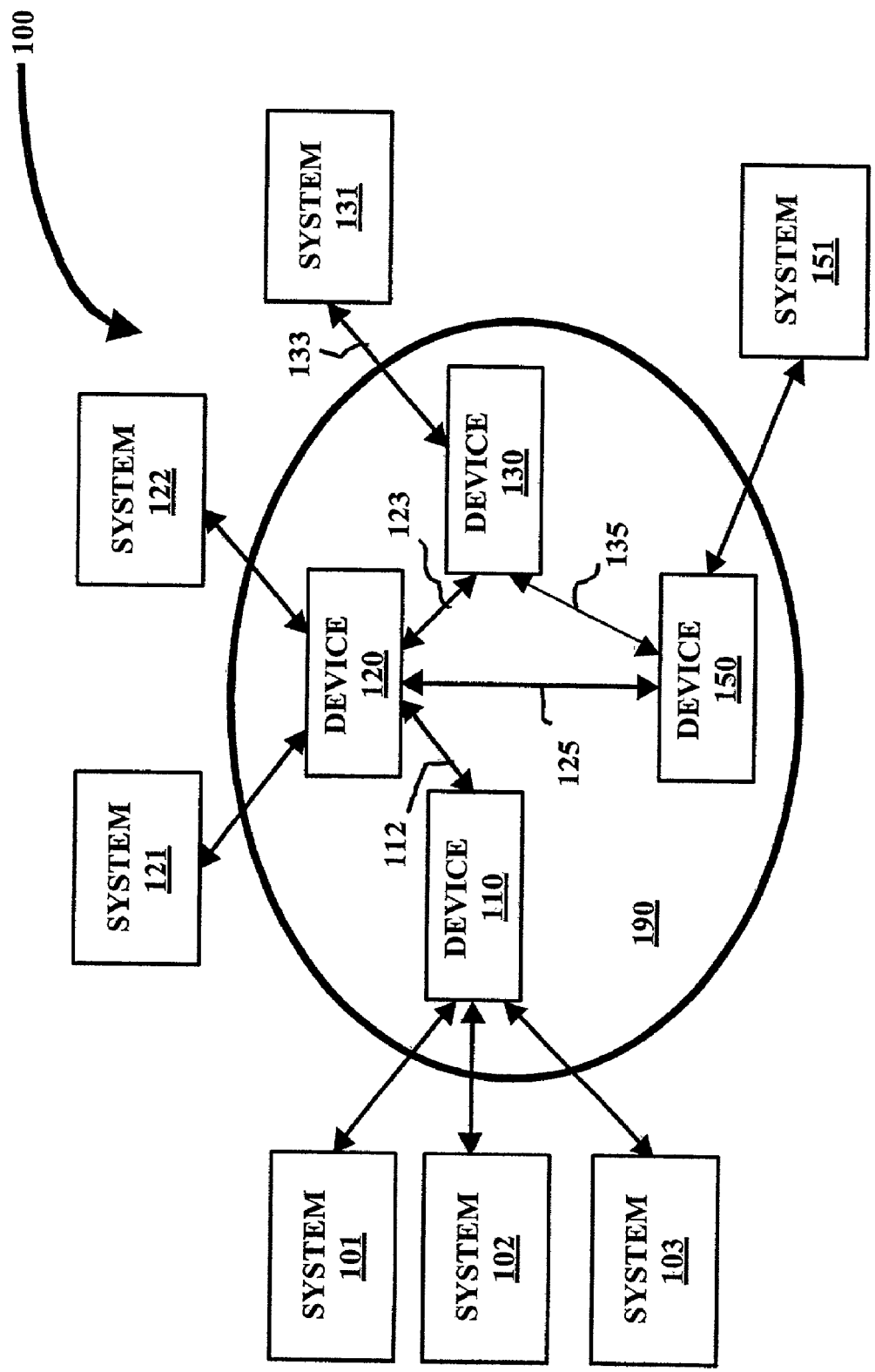
FIG. 1 is a block diagram illustrating an example communication environment in which the present invention can be implemented.

FIG. 1 is a block diagram illustrating an example network environment 100 in which the present invention can be implemented. Network environment 100 is shown containing layer-2 devices 110, 120, 130 and 150 forming a local area network (LAN) 190. Devices 110, 120, 130, and 150 provide connectivity to systems (101, 102, and 103), (121 and 122), (131) and (151) respectively. The operation of all components is described below in further detail.

For illustration, it is assumed that LAN 190 is implemented using Ethernet (or IEEE 802.3 protocol) well known in the relevant arts. The protocols are described in IEEE Standard 802.3, 2000 Edition, which is incorporated in its entirety herewith. In general, LAN 190 can be implemented using any broadcast medium. Each of the paths 112, 123, 125 and 135 are shown connecting respective pairs of devices implemented using broadcast protocols (Ethernet in the present embodiment).

Devices 110, 120, 130 and 150 correspond to layer-2 devices operating consistent with Ethernet protocol. In one embodiment, each device corresponds to Catalyst 5000/6000 series products (modified in accordance with several aspects of the present invention) available from Cisco Systems, Inc. Each device contains a port (not shown) which provides the physical interface to connect to the corresponding one of paths or one of the systems. Thus, device 110 may contain four ports connecting respectively to systems 101–103 and path 112.

Figure 4:
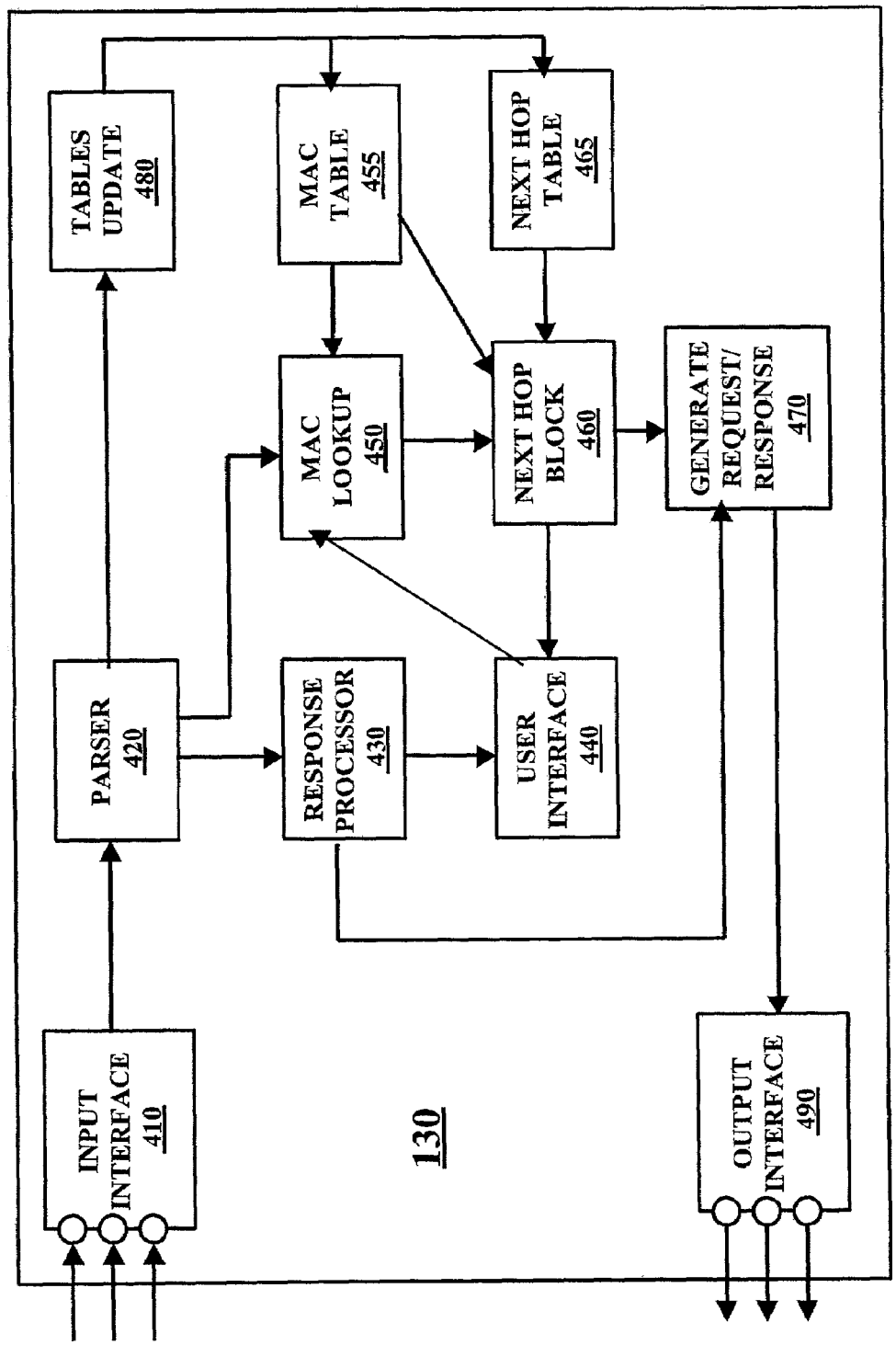
FIG. 4 is a block diagram illustrating the internals of a network device in an embodiment of the present invention.

A network administrator may enter a command on any of the devices implemented consistent with various aspects of the present invention to determine any intermediate devices present between two user systems. Many conventional layer-2 devices may be modified to provide such a feature to the network administrators. The manner in which a device may provide the feature is described below first with reference to a method (FIG. 2) and then with an example architecture (FIG. 4).

3. Method

Figure 2:
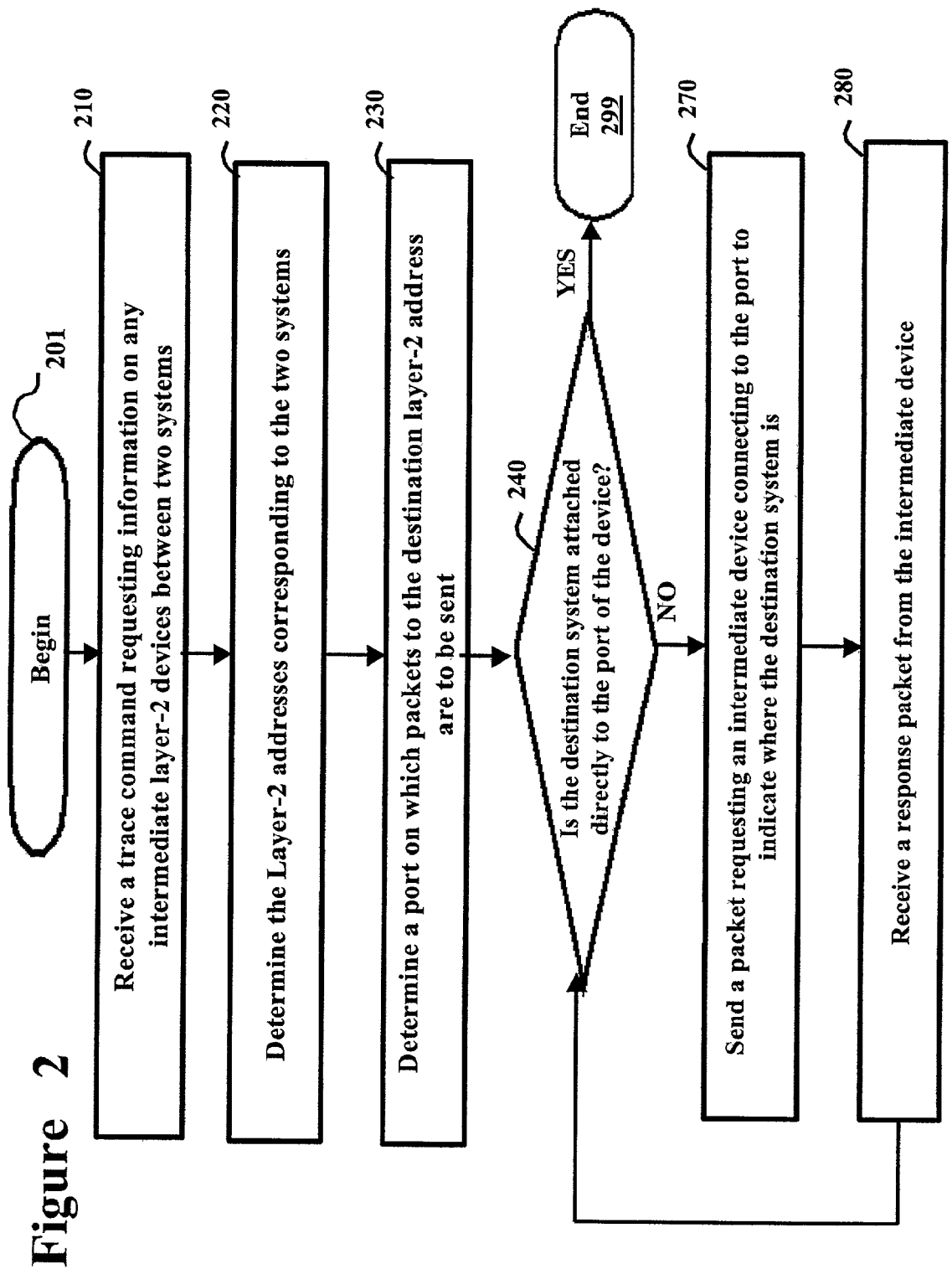
FIG. 2 is a flow chart illustrating a method in accordance with the present invention.

FIG. 2 is a flow-chart illustrating a method according to which a device (described with reference to device 130 for conciseness) may determine the route to a destination system. The method begins in step 201, in which control immediately passes to step 210.

In step 210, device 130 ("receiving device") receives a trace command requesting information on any layer-2 devices present between a source device and a destination device. The devices may specified in various ways, for example, as layer-2 address (e.g., Ethernet MAC address), layer-3 address (e.g., IP address) or a name (e.g., machine name which can be resolved into a layer-3 address). For present, it is assumed that the source system is connected directly to a port of the receiving device.

In step 220, the receiving device determines the layer-2 addresses corresponding to the two systems. If the systems were specified using layer-2 addresses, the determination is typically complete upon mere examination of the corresponding data. Even in the case a system is specified using other approaches, the layer-2 address may be determined in a known way.

In step 230, the receiving device determines a port on which communication can be established with the destination device. The determination depends on the technology used to implement LAN 190. An example embodiment with reference to Ethernet environment is described below in detail.

In step 240, the receiving device checks whether the destination system is connected directly to the receiving device. A system may be determined to be connected to a device directly if there are no other devices in between the system and device. With reference to FIG. 1, a system would be deemed to be connected directly to a device, if the system is connected to a port of the device.

If the destination system is determined to be connected to the port of the device, the entire route information to the destination system is deemed to be determined, and the method may end after providing the information to the network administrator. If the destination system is determined not to be connected to the device, then control passes to step 270.

In step 270, the receiving device sends a request packet to an intermediate device connecting to the port to indicate where the destination system is. The intermediate device generates a response packet indicating whether the destination system is connected directly to a port connected to the intermediate device or a next intermediate device which is in the path to the destination system.

In step 280, the receiving device receives the packet from the intermediate device and control then passes to step 240. If the packet indicates that the destination system is connected directly to the port (of the intermediate device), control passes to step 299 as the entire path to the destination system has been detected. Otherwise, control passes to step 270, which is performed treating the next intermediate device as "the intermediate device".

The loop of steps 240, 270 and 280 is repeated until the entire path is determined. Thus, the method of FIG. 2 can be used to determine the path from a source system (connected directly to a receiving device) to a destination system as described above. The same approach can be used to determine the path between the two devices also. The description is continued with respect to some general considerations in example environment(s) for determining the next neighbors.

4. Determining Next Neighbors in the Route in an Example Environment

In one embodiment, LAN 190 is implemented using Ethernet protocol technology and systems 101–103, 121, 122, 131 and 151 are all implemented consistent with the Ethernet protocol. It is further assumed that each of the systems and devices has a unique Internet Protocol (IP) address.

In one such embodiment, the determination of devices in the route to a destination system may entail three tasks: (1) determining in each device in the path the port which provides communication to the destination system; (2) determining whether the port is connected to the destination system or whether there is another intermediate device connected to the port; and (3) sending a request packet to the next intermediate device if the port is not connected to the destination system.

With respect to (1), assuming the received command contains an IP address for the destination system, device 130 may translate the IP address into an Ethernet address based on local table lookup. If the Ethernet Address is not available, a protocol such as Address Resolution Protocol (ARP) may be used to determine the Ethernet Address. Typically, a packet with the Ethernet Address of the source system is received in response, and the port on which the packet is deemed to provide the communication with the destination system.

With respect to step (2), device 130 may determine that device 150 is the adjacent device on the other side of path 135 by using protocols such as Cisco Discovery Protocol (CDP). In general, a device implemented according to CDP sends information to neighbors indicating the fact that it (i.e., the device) is a neighbor on that port, and IP address which can be used to contact the device. Thus, for example, device 130 may determine that device 150 is the neighbor on path 135 using CDP related packets received from device 150, and the IP address of device 150.

Device 130 may determine that the port is directly connected to the destination system if no CDP related messages are not received on the port. However, other protocols and approaches may be used in determining whether the destination system is connected to the port of a device and the manner in which to communicate with the next neighbor in the route to the destination system, as will be apparent to one skilled in the relevant arts based on the disclosure provided herein. Such other approaches and protocols are contemplated to be within the scope and spirit of several aspects of the present invention.

Thus, once the next device and the IP addresses of the next device in the route are determined, a request packet may be generated to the next device requesting whether the destination system is connected directly to a port of the next device or to provide information on a subsequent device in the route to the destination system. If the destination system is not connected to a port of the next device, an additional request packet may be sent to the subsequent device. The sequence of request and response packets may be used until a device indicates that the destination system is connected to a port of the device.

Thus, the above described method(s) and approach(es) can be used to determine the route to a destination device when the source device is connected directly to a port of the receiving device. An aspect of the present invention allows the route to be determined even in situations when a receiving device is not connected directly to the source system as described below.

5. Situation When a Receiving Device is Not Connected to Source System

Figure 3:
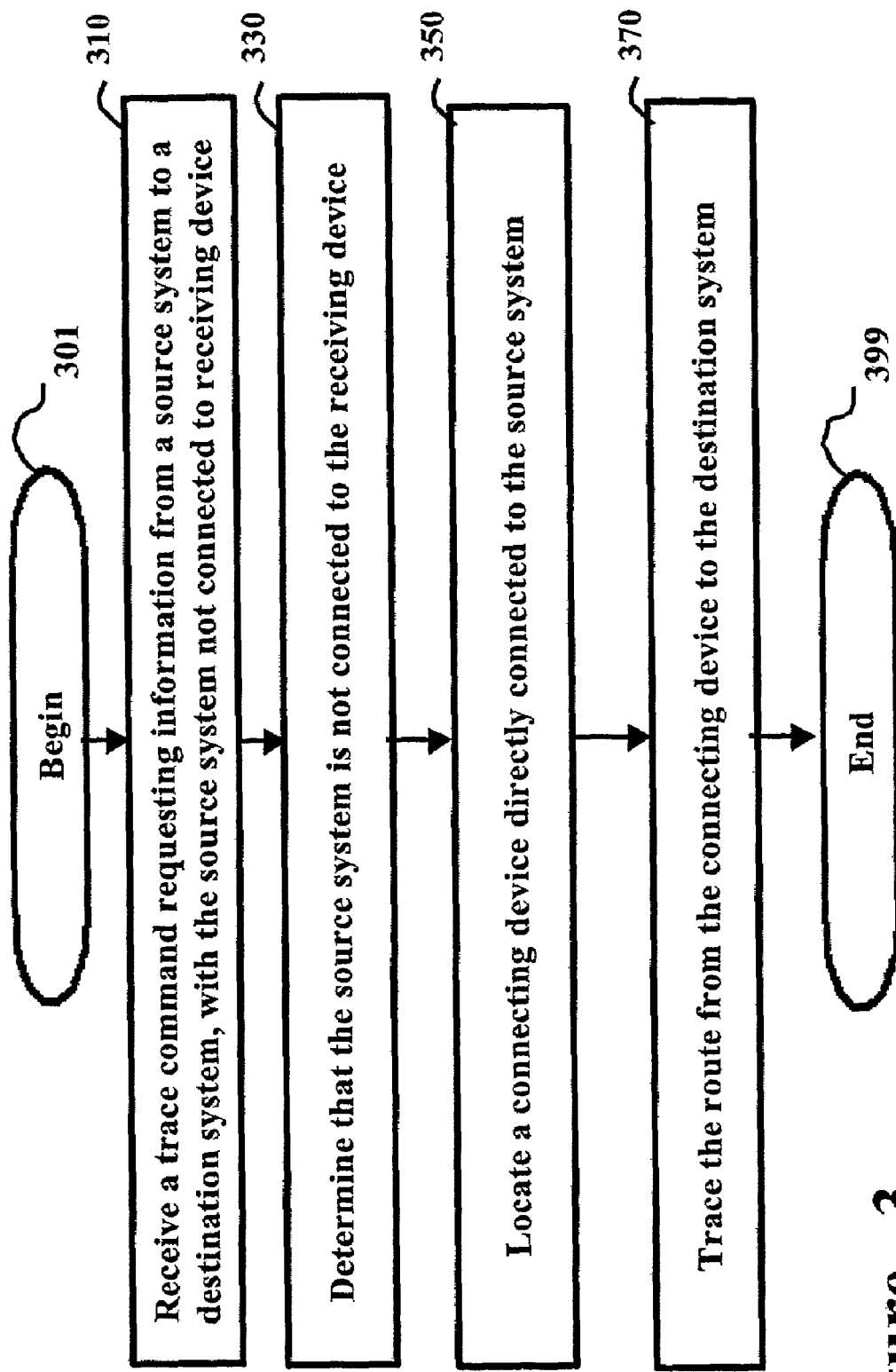
FIG. 3 is a flow chart illustrating a method using which the route between a source system and a destination system may be determined even when the receiving device is not directly connected to the source system.

FIG. 3 is a flow chart illustrating a method using which the route from a source system to a destination system can be determined even when the source system is not directly connected to a receiving device. The method is described with respect to a situation in which device 130 ("receiving device") receives a command to provide route information from system 101 ("source system") to system 151 (destination system).

The method begins in step 301, in which control immediately passes to step 310. In step 310, device 130 receives the trace command. In step 330, the receiving device determines that the source system is not connected to any of the receiving device's ports, for example, by first determining a port providing communication to the source system and then using the absence of CDP related information on the determined port as described above. Other approaches may as well be used depending on the available products and technologies.

In step 350, the device ("connecting device") that connects directly to the source system may be located treating the source system as a destination system ("temporary destination system"), and tracing the route from the receiving device to the source system. With respect to the present example, device 130 may first determine that port connecting to path 135 needs to be used for communicating with system 101. It is here assumed that a protocol such as spanning tree protocol has earlier determined that paths (135, 125 and 112) should be used instead of paths (123 and 112).

Assuming a protocol such as CDP (Cisco Discovery Protocol) provides information that device 150 is connected on the other side of path 135, device 150 may send a request packet including information on the temporary destination system. Device 150 indicates that device 120 (identified by a corresponding ID address) should be contacted next to continue tracing the route to the temporary destination.

The sequence of request and responses may be continued until device 1110 indicates that the temporary destination system 101 is connected to a port of device 110. Thus, by tracing the route to the source system specified in a command, a receiving device may locate the connecting device (device 110 in the present example) connecting to the source system.

An alternative embodiment may be implemented using a multicast (including broadcasts) packet, with the multicast packet containing the information of the temporary destination system (or the source system specified in the command). Each device may be designed to respond if the temporary destination system is connected directly to the device. Many implementations consistent with such an approach will be apparent to one skilled in the relevant arts based on the disclosure herein, and such implementations are contemplated to be within the scope and spirit of the present invention.

In step 370, the source device (130) may trace the path from the device (110) connecting to the source system. The method of FIG. 2 described above may be used to determine the route. Thus, an aspect of the present invention enables a network administrator to enter a trace command on any device of network 190 irrespective of where the source and destination systems are present. The description is continued with reference to an example packet format which can be used for the request and response packets between devices.

6. Packet Format

In one embodiment, UDP/IP packets with a similar format is used for both requests and responses. Only the details of UDP and IP as relevant to an understanding of the presented specific examples are described herein. For further details of UDP and IP, the reader is referred to documents entitled RFCs 791 and 768, available from www.ietf.org, which are both incorporated in their entirety herewith. The packet format is described below in further detail.

Any port number not inconsistent without prior uses (e.g., the standard ports used for applications such as Telenet, FTP) may be used to indicate that the UDP packet relates to requests and responses, and the data portion of the UDP packet is to be interpreted according to the further details as noted below:

Byte 1 (packet type): 1=trace destination system; 2=trace source system (i.e., when the source system in not connected to the receiving device); 3=reply for destination trace; and 4=reply for source trace.

Byte 2 (version Number): value indicates version number of the implementation.

Bytes 3–4: length of the packet.

Bye 5: number of attributes.

Bytes 6–end (Attributes): The requested or provided information according to a pre-determined convention. The first byte of an attribute may specify the attribute type, second byte the length of the attribute, and the remaining bytes the data necessary for the attribute.

Examples of attributes are the IP address of the system being traced, the IP (or MAC/Ethernet) address of the next device, the port to which the system is connected, etc. The attributes may be extended to provide other features (e.g., port speed, port MAC address) which may be of interest to a network administrator.

An example request packet may contain MAC address of the source system, MAC address of the destination system, and IP address of the receiving device. The MAC address of the destination system may be used to determine the next device in the path and the IP address of the receiving device may be used to send a response packet. An example response packet may contain the IP address of the device sending the response packet, the IP address of the next device in the path to the destination system, and port related information (e.g., speed of the ports).

Using the packet format of above, a receiving device (i.e., device receiving a trace command) may trace the route from any source system to a destination system.

7. Network Device

FIG. 4 is a block diagram illustrating the details of device 130 in one embodiment. Device 130 is shown containing inbound interface 410, parser 420, response processor 430, user interface 440, MAC (medium access control) lookup 450, MAC table 455, next hop block 460, next hop table 465, generate request/response block 470, tables update block 480 and outbound interface 490. Each component is described below in detail.

Each component of device 130 may be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing device 130 with a desired mix of hardware, software and/or firmware.

Inbound interface 410 is shown receiving packets from three ports (shown as logically as circles) corresponding to paths 123, 135 and 133 of FIG. 1, and forwards the packets to parser 420. Inbound interface 410 provides the electrical and other protocol interfaces necessary to receive packets from various paths, and may be implemented in a known way. Outbound interface 490 is also described similarly, except that the packets received from generate request/response block 470 are transmitted in the outbound direction on the same three ports.

Parser 420 forwards the packets (originating from systems and other devices) received from inbound interface 410 to one of response processor 430, MAC lookup block 450 and tables update block 480. The specific one of the units to which to forward each packet is determined typically by examining the content of the packet.

Response processor 430 receives a response packet generated by another device. The response packet is generally generated in response to a request packet sent by generate request/response block 470. The response processor indicates whether the responding device is connected to the destination system or a next device in the route to the destination device.

If the destination device is connected to the responding device, then the route to the destination device (or temporary destination device) is entirely traced. If a response packet contains information for a next device in the route, response processor 430 interfaces with generate request/response processor 470 to generate a request directed to the next device.

User interface 440 provides a convenient interface to a network administrator. Thus, user interface 440 may receive a command from the user, and generate the route information. In an embodiment, user interface 440 updates a display as each device in the route is determined (by examining a response packet). With respect to input interface, a network administrator may enter a command using a command line interface (CLI) provided with device 130.

User interface 440 may interface with MAC lookup 450 to initiate the processing of a command. User interface 440 may also contain the logic to determine and process commands which specify a source system not connected to device 130. The logic first traces the route to the source system to determine a device connecting directly to the source system, and then starts tracing the route from the connecting device to the destination system as described above in further detail. The display to the network administrator may indicate that the source is being traced first, and then each intermediate device in the route from the source system to the destination.

MAC table 455 may contain entries mapping each IP address to a corresponding MAC (e.g., Ethernet) address. MAC table 455 entries may be populated in a known way. Next hop table 465 contains information on a device connecting on the other end of the each path connecting to a port. In one embodiment, next hop table 465 is populated by protocols such as CDP, in which neighbor devices broadcast information as described in sections above. MAC table 455 and next hop table 465 may be implemented in a Random Access Memory, to attain a high throughput performance.

Tables update block 480 updates the entries in MAC table 455 and next HOP table 465 based on the packets received from various sources. The implementation of tables update block 480 depends on the protocols and technologies being used in LAN 190. Tables update block 480 may be implemented in a known way.

MAC lookup block 450 may receive a trace command (from user interface 440) and determine an Ethernet Address corresponding to any systems in the command. The Ethernet address(es) may be passed to next hop block 460. Next hop block 460 determines whether a system specified in a command is connected directly to a port on device 130. If the system is not connected to the port, next hop block 460 determines the address of a neighbor (i.e., connected to a path provided through a port on device 130).

The combination of MAC lookup block 450 and next hop block 460 may also process a request packet (received from parser 420) generated by other devices (e.g., 110). In both cases (i.e., when processing a request and when processing a command), the information necessary for the next device in the route is generated. An embodiment of next hop block 460 uses information provided by protocols such as CDP.

Generate request/response block 470 generates a request packet after response processor 430 processes a response packet indicating that the route needs to be traced further. The request packet is directed to a device specified in the response packet. A request packet may also be generated when initiating a trace. Generate request/response block 470 may generate a response packet when a request packet (generate by another device) is processed by next hop block 460.

Thus, the components described above may operate to generate requests and responses to trace the route between a source system and a destination system. Another embodiment of device 130 may be implemented substantially in software as described below in further detail. It should be noted that yet another embodiment of the present invention enables the embodiments to be implemented in computer systems (i.e., not operating as devices).

8. Software Implementation

Figure 5:
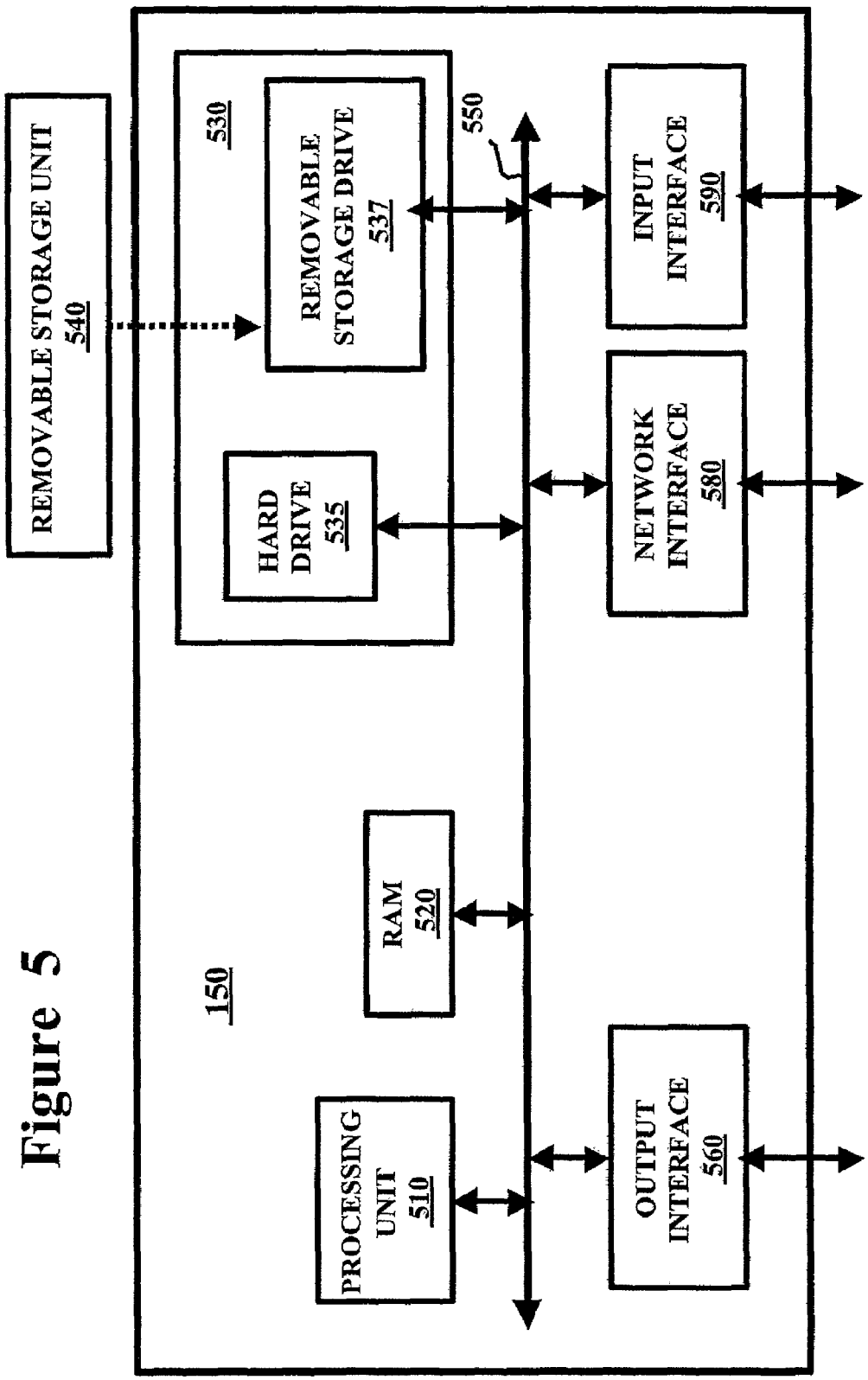
FIG. 5 is a block diagram illustrating an embodiment of network device implemented substantially in the form of software.

FIG. 5 is a block diagram illustrating the details of device 130 in one embodiment. Device 130 is shown containing processing unit 510, random access memory (RAM) 520, storage 530, output interface 560, network interface 580 and input interface 590. Each component is described in further detail below.

Output interface 560 provides output signals (e.g., display signals to a display unit, not shown) which can form the basis for a suitable user interface for a user to interact with Device 130. Input interface 590 (e.g., interface with a key-board and/or mouse, not shown) enables a user to provide any necessary inputs to device 130. Output interface 560 and input interface 590 can be used to provide a command level interface and to display the route information to a network administrator.

Network interface 580 enables device 130 to send and receive various packets in accordance with the present invention. Network interface 580 may correspond to inbound interface 410 and/or outbound interface 490 of FIG. 4. Network interface 580, output interface 560 and input interface 590 can be implemented in a known way.

RAM 520 and storage 530 may together be referred to as a memory. RAM 530 (can contain multiple memory units) may receive instructions and data on path 550 from storage 530. Storage 530 may contain units such as hard drive 535 and removable storage drive 537. Storage 530 may store the software instructions and data, which enable device 130 to provide several features in accordance with the present invention.

Some or all of the data and instructions may be provided on removable storage unit 540, and the data and instructions may be read and provided by removable storage drive 537 to processing unit 510. Floppy drive, magnetic tape drive, CD-ROM drive, DVD Drive, Flash memory, removable memory chip (PCMCIA Card, FPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520. In general processing unit 510 reads sequences of instructions from various types of memory medium (including RAM 520, storage 530 and removable storage unit 540), and executes the instructions to provide various features described above.

It should be understood that the software implementation of above can be implemented in other units such as general purpose computer systems (e.g., user system 101). In such a situation, the computer system may need to issue request packets and process response packets similar to device 130 described above. Thus, embodiments described above can be used to provide the route information between any two systems (devices). A network administrator may accordingly conveniently detect any intermediate devices between two systems.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of processing a command requesting information on any intermediate layer-2 devices present in a route from a first system to a second system, said any intermediate devices being contained in a network implemented on a broadcast medium, said network containing a plurality of devices including said any intermediate devices, said method comprising:
   receiving said command in a receiving device;
   sending a request packet from said receiving device to a present layer-2 device requesting information on whether said second system is connected directly to said present layer-2 device;
   receiving by said receiving device a response packet from said present layer-2 device, wherein said response packet indicates whether said second system is connected directly to said present layer-2 device, wherein said response packet further identifies a subsequent layer-2 device in a route from said present layer-2 device to said second system if said second system is not connected directly to said present layer-2 device, wherein said subsequent layer-2 device is next to said present layer-2 device in said route to said second system; and
   repeating by said receiving device said sending and receiving by using said subsequent layer-2 device in the place of said present layer-2 device until said response packet indicates that said second system is directly connected to said present layer-2 device.

2. The method of claim 1, wherein said response packet indicates that said receiving device is not connected directly to said first layer-2 device, said method further comprising:
   locating a directly connected device which is connected directly to said first system;
   using said directly connected device as said present layer-2 device, wherein said locating and said using are performed before said sending; and
   performing said repeating in said receiving device to determine said route.

3. The method of claim 2, wherein said locating comprises:
   substituting said receiving device as said first layer-2 device; and
   performing said repeating to determine said directly connected device.

4. The method of claim 2, wherein said locating comprises sending a multicast packet directed to said plurality of devices, said multicast packet containing an identifier of said first system, wherein each of said plurality of devices is designed to respond indicating if said first system is connected directly to the device.

5. The method of claim 1, further comprising:
   determining a first layer-2 device which is connected directly to said first system, logically viewing said first layer-2 device as a present layer-2 device if said second system is also not connected directly to said first layer-2 device;
   wherein said determining is also performed by said receiving device.

6. The method of claim 5, further comprising providing a command line interface to enable a network administrator to enter said command on said receiving device.

7. The method of claim 1, wherein said second system is deemed to be directly connected to said first layer-2 device if said second system is connected to a port of said first layer-2 device.

8. The method of claim 7, further comprising:
   receiving in said receiving device a neighbor packet from a neighbor device on at least one port; and
   concluding in said receiving device that a system communicating on another port is connected directly to said another port by the absence of reception of neighbor packets on said another port.

9. The method of claim 8, wherein said network is implemented using Ethernet/802.3 protocol.

10. The method of claim 1, wherein said request packet and said response packet are generated consistent with UDP/IP protocol.

11. A method of supporting the tracing of a route containing a sequence of layer-2 devices between a first system and a second system, said method being performed in a layer-2 device forming a part of a network, said method comprising:
    receiving in said layer-2 device a request packet from a central device, said request packet containing an identifier for said second system, wherein said request packet requests information on whether said second system is connected directly to said layer-2 device;
    determining in said layer-2 device whether said layer-2 device is connected directly to said second system;
    identifying in said layer-2 device a next device if said layer-2 device is not connected directly to said second system, wherein said next device is next to said layer-2 device in a route from said first system to said second system;
    generating in said layer-2 device a response packet, wherein said response packet indicates whether said second system is connected directly to said layer-2 device, said response packet including data identifying said next device if said second system is not connected directly to said layer-2 device; and
    sending from said layer-2 device to said central device said response packet irrespective of whether said central device is in said route or whether said layer-2 device is a last device in said route,
    whereby said central device uses said data identifying said next device to determine said sequence of layer-2 devices.

12. The method of claim 11, wherein said identifying comprises:
    examining a table in said layer-2 device to determine a port on which said second system communicates; and
    locating a device connecting on said port, wherein said located device comprises said next device.

13. The method of claim 12, wherein said locating comprises:
    receiving a neighbor packet from said next device on said port indicating a next device identifier identifying said next device; and
    including said next device identifier in said response packet.

14. The method of claim 13, wherein said first system is deemed to be connected directly to said layer-2 device if said first system is present on a port of said layer-2 device, wherein determining is based on the absence of reception of said neighbor packet on said port.

15. An apparatus processing a command requesting information on any intermediate layer-2 devices present in a route from a first system to a second system, said any intermediate devices being contained in a network implemented on a broadcast medium, said network containing a plurality of devices including said any intermediate devices, said apparatus comprising:

means for receiving said command in a receiving device;

means for sending a request packet from said receiving device to a present layer-2 device requesting information on whether said second system is connected directly to said present layer-2 device;

means for receiving a response packet from said present layer-2 device, wherein said response packet indicates whether said second system is connected directly to said present layer-2 device, wherein said response packet further identifies a subsequent layer-2 device in a route from said present layer-2 device to said second system if said second system is not connected directly to said present layer-2 device, wherein said subsequent layer-2 device is next to said present layer-2 device in said route to said second system; and means for repeating said sending and receiving by using said subsequent layer-2 device in the place of said present layer-2 device until said response packet indicates that said second system is directly connected to said present layer-2 device wherein said means for receiving and said means for repeating are also contained in said receiving device.

16. The apparatus of claim 15, wherein said response packet indicates that said receiving device is not connected directly to said first layer-2 device, wherein said means for determining further comprises:

means for locating a directly connected device which is connected directly to said first system;

means for using said directly connected device as said present layer-2 device; and means for performing said repeating to determine said route, said means for performing being contained in said receiving device.

17. The apparatus of claim 16, wherein said means for locating comprises:

means for substituting said receiving device as said first layer-2 device; and means for performing said repeating to determine said directly connected device.

18. The apparatus of claim 16, wherein said means for locating comprises sending a multicast packet directed to said plurality of devices, said multicast packet containing an identifier of said first system, wherein each of said plurality of devices is designed to respond indicating if said first system is connected directly to the device.

19. A layer-2 device for supporting the tracing of a route containing a sequence of layer-2 devices between a first system and a second system, said layer-2 device being comprised in a network based on broadcast medium, said layer-2 device comprising:

means for receiving in said layer-2 device a request packet from a central device, said request packet containing an identifier for said second system, wherein said request packet requests information on whether said second system is connected directly to said layer-2 device;

means for determining in said layer-2 device whether said layer-2 device is connected directly to said second system;

means for identifying in said layer-2 device a next device if said layer-2 device is not connected directly to said second system, wherein said next device is next to said layer-2 device in a route from said first system to said second system;

means for generating in said layer-2 device a response packet, wherein said response packet indicates whether said second system is connected directly to said layer-2 device, said means for generating including data identifying said next device in said response packet if said second system is not connected directly to said layer-2 device; and means for sending from said layer-2 device to said central device said response packet irrespective of whether said central device is in said route or whether said layer-2 device is a last device in said route, whereby said central device uses said data identifying said next device to determine said sequence of layer-2 devices.

20. The layer-2 device of claim 19, wherein said means for identifying comprises:

means for examining a table in said layer-2 device to determine a port on which said second system communicates; and means for locating a device connecting on said port, wherein said located device comprises said next device.

21. The layer-2 device of claim 20, wherein said means for locating comprises:

means for receiving a neighbor packet from said nextdevice on said port indicating a next device identifier identifying said next device; and means for including said next device identifier in said response packet.

22. The layer-2 device of claim 20, wherein said first system is deemed to be connected directly to said layer-2 device if said first system is present on a port of said layer-2 device, wherein determining is based on the absence of reception of said neighbor packet on said port.

23. A computer readable medium carrying one or more sequences of instructions for causing a device to process a command requesting information on any intermediate layer-2 devices present in a route from a first system to a second system, said any intermediate devices being contained in a network implemented on a broadcast medium, said network containing a plurality of devices including said any intermediate devices, wherein execution of said one or more sequences of instructions by one or more processors contained in said device causes said one or more processors to perform the actions of:

receiving said command in a receiving device;

sending a request packet from said receiving device to a present layer-2 device requesting information on whether said second system is connected directly to said present layer-2 device;

receiving by said receiving device a response packet from said present layer-2 device, wherein said response packet indicates whether said second system is connected directly to said present layer-2 device, wherein said response packet further identifies a subsequent layer-2 device in a route from said present layer-2 device to said second system if said second system is not connected directly to said present layer-2 device, wherein said subsequent layer-2 device is next to said present layer-2 device in said route to said second system; and repeating by said receiving device said sending and receiving by using said subsequent layer-2 device in the place of said present layer-2 device until said response packet indicates that said second system is directly connected to said present layer-2 device.

24. The computer readable medium of claim 23, wherein said response packet indicates that said receiving device is not connected directly to said first layer-2 device, further comprising one or more sequences of instructions for:
  locating a directly connected device which is connected directly to said first system;
  using said directly connected device as said present layer-2 device, wherein said locating and said using are performed before said sending; and
  performing said repeating in said receiving device to determine said route.

25. The computer readable medium of claim 24, wherein said locating comprises:
  substituting said receiving device as said first layer-2 device;
  third performing said repeating;
  using a last one of said present-layer 2 determined by said third performing as said directly connected device.

26. The computer readable medium of claim 24, wherein said locating comprises sending a multicast packet directed to said plurality of devices, said multicast packet containing an identifier of said first system, wherein each of said plurality of devices is designed to respond indicating if said first system is connected directly to the device.

27. The computer readable medium of claim 23, further comprising one or more sequences of instructions for:
  determining a first layer-2 device which is connected directly to said first system, logically viewing said first layer-2 device as a present layer-2 device if said second system is also not connected directly to said first layer-2 device;
  wherein said determining, sending, receiving, and repeating are performed by said receiving device.

28. The computer readable medium of claim 27, further comprising one or more sequences of instructions for providing a command line interface to enable a network administrator to enter said command on said receiving device.

29. The computer readable medium of claim 23, wherein said second system is deemed to be directly connected to said first layer-2 device if said second system is connected to a port of said first layer-2 device.

30. The computer readable medium of claim 29, further comprising one or more sequences of instructions for:
  receiving in said receiving device a neighbor packet from a neighbor device on at least one port; and
  concluding in said receiving device that a system communicating on another port is connected directly to said another port by the absence of reception of neighbor packets on said another port.

31. The computer readable medium of claim 30, wherein said network is implemented using Ethernet/802.3 protocol, further comprising one or more instructions for generating said request packet consistent with UDP/IP protocol.

32. A computer readable medium carrying one or more sequences of instructions for causing a layer-2 device to support the tracing of a route containing a sequence of layer-2 devices between a first system and a second system, said layer-2 device being comprised in a network based on broadcast medium, wherein execution of said one or more sequences of instructions by one or more processors contained in said layer-2 device causes said one or more processors to perform the actions of:
  receiving in said layer-2 device a request packet from a central device, said request packet containing an identifier for said second system, wherein said request packet requests information on whether said second system is connected directly to said layer-2 device;
  determining in said layer-2 device whether said layer-2 device is connected directly to said second system;
  identifying in said layer-2 device a next device if said layer-2 device is not connected directly to said second system, wherein said next device is next to said layer-2 device in a route from said first system to said second system;
  generating in said layer-2 device a response packet, wherein said response packet indicates whether said second system is connected directly to said layer-2 device, said response packet including data identifying said next device in said response packet if said second system is not connected directly to said layer-2 device; and
  sending from said layer-2 device to said central device said response packet irrespective of whether said central device is in said route or whether said layer-2 device is a last device in said route,
  whereby said central device uses said data identifying said next device to determine said sequence of layer-2 devices.

33. The computer readable medium of claim 32, wherein said identifying comprises:
  examining a table in said layer-2 device to determine a port on which said second system communicates; and
  locating a device connecting on said port, wherein said located device comprises said next device.

34. The computer readable medium of claim 33, wherein said locating comprises:
  receiving a neighbor packet from said next device on said port indicating a next device identifier identifying said next device; and
  including said next device identifier in said response packet.

35. A device for supporting the tracing of a route containing a sequence of layer-2 devices between a first system and a second system, said device being comprised in a network based on broadcast medium, said device comprising:
  an inbound interface receiving a request packet from a central device, said request packet containing an identifier for said second system, wherein said request packet requests information on whether said second system is connected directly to said device;
  a next hop block determining whether said device is connected directly to said second system, said next hop block identifying a next device if said layer-2 device is not connected directly to said second system, wherein said next device is next to said layer-2 device in a route from said first system to said second system;
  a generate request/response block generating a response packet, wherein said response packet indicates whether said second system is connected directly to said device, said response packet including data identifying said next device if said second system is not connected directly to said layer-2 device; and
  an outbound interface sending said response packet to said central device irrespective of whether said central device is in said route or whether said device is a last device in said route.

36. The layer-2 device of claim 35, further comprising:
  a memory storing a first table and a second table, said first table indicating a port on which each system communicates, said second table indicating a device connecting to each port; and
  a port determination block determining a port on which said second system communicates,
  wherein said next hop block examines said second table to determine said a next device according to the port determined by said port determination block, wherein said next device is contained in said sequence of layer-2 devices.

37. The layer-2 device of claim 36, wherein said next hop block determines that said second system is directly connected to a first port indicated by said first table if no device is associated with said first port in said second table.

38. The layer-2 device of claim 35, further comprising an user interface receiving a trace command from a network administrator.

39. The layer-2 device of claim 38, wherein said response packet indicates that said layer-2 device is not connected directly to said first system, said layer-2 device further comprising a control logic to trace a directly connecting device connecting directly to said first system, wherein said route is traced from said directly connecting device using said inbound interface, said outbound interface, said next hop block and said generate request/response block.

40. The layer-2 device of claim 38, wherein said response packet indicates that said layer-2 device is not connected directly to said first system, said layer-2 device further comprising a control logic to trace a directly connecting device connecting directly to said first system by sending a multicast packet.

41. The layer-2 device of claim 35, further comprising a response processor to receive a response packet, wherein said response packet indicates a next device in said route, wherein said generate request/response block generates another request packet directed to said next device, wherein said another request packet requests said next device to indicate whether said second system is connected directly to said next device.

* * * * *